Figure 6:
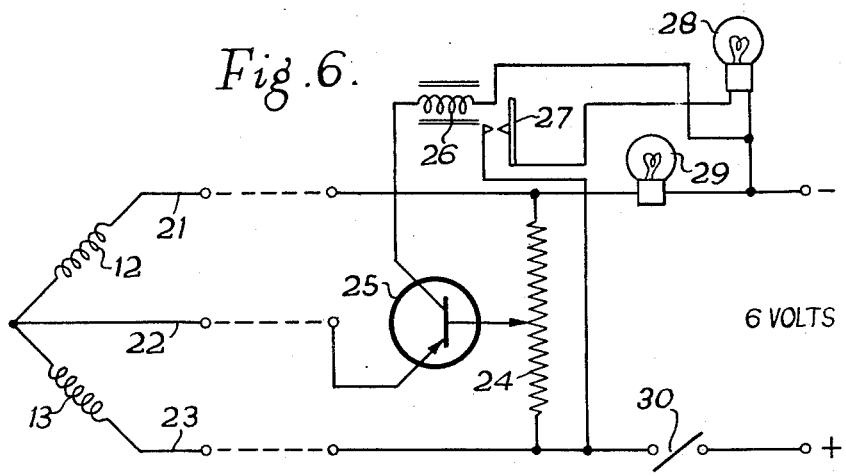

June 18, 1963 J. SIEGER 3,094,393
APPARATUS FOR DETECTING INFLAMMABLE GASES
Filed Oct. 17, 1960 2 Sheets-Sheet 1
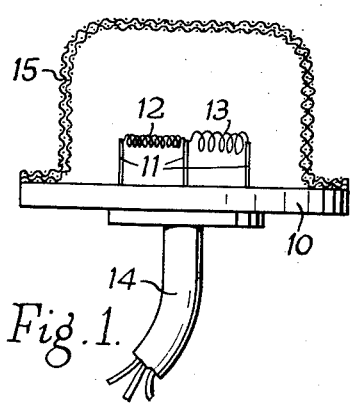
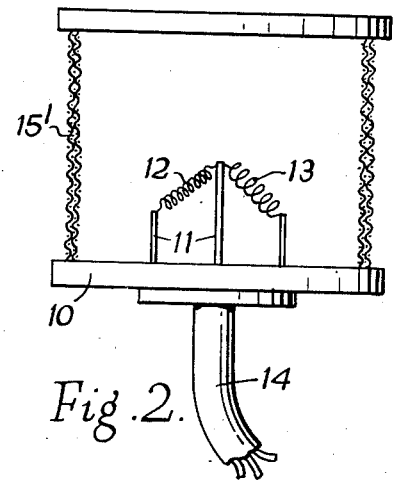
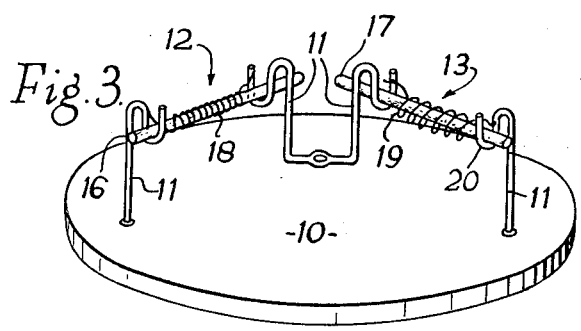
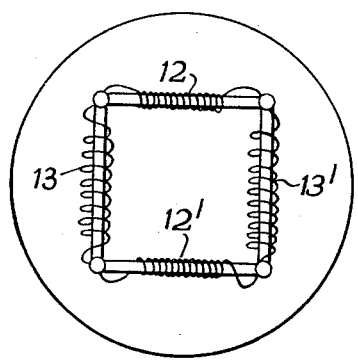
INVENTOR
Joshua Sieger
BY
Kemon, Palmer + Stewart
ATTORNEY United States Patent Office 3,094,393
Patented June 18, 1963

3,094,393
APPARATUS FOR DETECTING INFLAMMABLE GASES
Joshua Sieger, Greystones, Western Ave., Branksome Park, Bournemouth, England
Filed Oct. 17, 1960, Ser. No. 63,060
Claims priority, application Great Britain Oct. 23, 1959
6 Claims. (Cl. 23—254)

This invention relates to apparatus for detecting the presence of inflammable gases by the Wheatstone bridge method.

In one known form of apparatus employing this method, two adjacent arms of the bridge are constituted by helices of platinum wire surrounding cores of asbestos, one of the cores being impregnated to render it catalytically active and the other core not being impregnated. Heating current from a source connected across one diagonal of the bridge is passed through the two helices and an indicating meter is connected across the other diagonal. In the presence of an inflammable gas the temperature of the helix associated with the impregnated core increases whereas that of the other helix remains unchanged. The increase of resistance resulting from the rise in temperature of the former helix unbalances the bridge and the unbalance is indicated on the meter.

A disadvantage of this known form of apparatus is the relatively high heating current (of the order of one ampere) that has been found necessary. Apart from the undesirability of large energy consumption there is the additional difficulty that if a head containing the two helices is to be located remote from the remainder of the apparatus, as is usually desirable, relatively heavy conductors must be provided in the connecting cable in order to avoid undue losses in the cable.

The present invention has for its principal object to provide apparatus for detecting inflammable gases which requires substantially less heating energy than known apparatus.

The present invention is based upon the discovery that the curve relating the heating current necessary for efficient operation and the width of the spaces between the turns of a helix associated with a catalyst falls as the said width is reduced.

According to the present invention, therefore, there is provided apparatus for detecting the presence of inflammable gases employing a Wheatstone bridge, at least two arms of which contain respectively a detector element and a balancing element, the two elements being disposed close together so as to be exposed to similar ambient conditions and having substantially the same temperature coefficient of resistance, the detector element being much more active catalytically than the balancing element, the detecting element having a helically wound wire, and the width of the spaces between the turns of the helix being less than three times the wire diameter. The said width is preferably substantially equal to the wire diameter.

If the wire is not of circular cross-section, the "diameter" is taken as the thickness of the wire measured in a direction parallel to the axis of the helix.

The balancing element is conveniently also a wire helix, the turns of which are more widely spaced than those of the detector element.

The helix of the detector element may be rendered catalytically active by coating it with finely divided platinum, platinum black or platinum sponge.

Preferably, however, the detector element is in the form of a helical heater wire surrounding and in contact with a core impregnated with a catalytically active substance, such as one or more of those referred to for coating the wire. The core may, for instance, be of ceramic or asbestos.

The wire is preferably of platinum but other metals or alloys can be used, for instance palladium, a metal of the rhodium group, nickel, or an alloy containing nickel which does not oxidise unduly when maintained for long periods at the working temperature.

The catalytically active substances hereinbefore referred to are effective for the detection of coal gas or petrol vapour but not so satisfactory for methane for which palladium is preferable. According to a feature of the invention, therefore, the core of the detector element is impregnated with a mixture containing both platinum and palladium.

Figure 5:
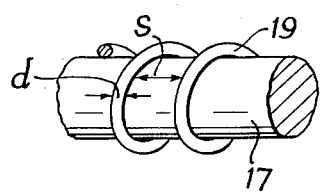

The invention will be described, by way of example, with reference to the accompanying drawings in which FIGS. 1 and 2 are somewhat diagrammatic views of two forms of detector head that may be used in carrying out the present invention, FIG. 3 shows how detector and balancing elements in FIGS. 1 and 2 may be supported, FIG. 4 shows an alternative arrangement for a detector head using two detector and two balancing elements, FIG. 5 is a much enlarged view of part of an element that may be used in FIGS. 1, 2 and 4, and FIG. 6 is a diagram of a preferred form of circuit according to the invention.

Referring to FIG. 1, this shows a head comprising a base 10 of insulating material carrying on supports 11 a detecting element 12 and a balancing element 13. Connections to these elements are made through a cable 14 which may connect the head with the remainder of the detector equipment. A wire-gauze cover 15 is provided to prevent flash-back. The cover may be of two layers of 50 mesh wire gauze.

In the form of head shown in FIG. 2 the elements 12 and 13 are inclined to the horizontal and a cylindrical gauze cover 15' is provided.

As shown in FIG. 3 each element 12 and 13 may comprise a core 16, 17 of ceramic or asbestos having a heater wire 18, 19 for example of platinum, wound thereon. The core 16 is impregnated with catalytically active material and the core 17 is not impregnated. The supports 11 may be of wire bent as shown to provide loops 20 in which the cores rest. The loops may be crimped so as to grip the cores.

In one example the wires 18 and 19 are each of 0.0035 inch diameter platinum, 4 inches long having a resistance of about 3 ohms. The wires are wound on asbestos cores 16 and 17 each 2 mm. in diameter. The spaces between turns in the detector element 12 are 0.0035 inch, that is to say equal to the wire diameter, and those in the balancing element 13 are 0.1 inch. In FIG. 5 the diameter of wire 19 is shown as $d$ and the space between turns is shown as $s$.

The core 16 is impregnated with a solution comprising 0.1 gram chloroplatinic acid, 0.02 gram palladium chloride and 10 ccs. formaldehyde, preferably with a few drops of turpentine to assist dispersion of the metals in the core. The wire 18 is heated to incandescence in order to remove the solvent and decompose the platinum and palladium salts to leave the metals themselves in the core. This may be done by passing a suitable current, say 0.5 amp., through the wire until the formaldehyde has been driven off, after which hydrogen gas is applied and causes the wire to glow by catalytic action. The current is then interrupted and the wire continues to glow while the hydrogen atmosphere is maintained. The glowing is allowed to continue until sufficient decomposition of the salts has taken place.

If a curve is plotted of the spacing $s$ (FIG. 5) against the current through the heating wire of the detector element 12 (assumed to be of 0.0035 inch diameter) required to produce incandescence of the element in the presence of coal gas, it is found that with spacings s down to about 0.05 inch the current remains substantially at 1 ampere; at a spacing s of about 0.025 inch the current needed begins to fall rapidly as the spacing is reduced until at a value of about 0.01, or three times the wire diameter, the current has fallen to below 0.7 amp., at about 0.007, or twice the wire diameter, to 0.55 amp., and at 0.0035, or a spacing equal to the wire diameter, the current is as low as about 0.3 amp. Some spacing between the wires is, however, necessary in order that the gas may have access to the catalyst. A practical optimum value for the spacing appears to be about equal to the wire diameter.

The principal reason for the decrease in the required current with decrease in spacing is believed to be that with smaller spacings the heat generated is more confined within the helix and between turns and the fraction of the surface of the wire exposed to the free atmosphere, and thereby the cooling, is reduced.

FIG. 4 shows a part of a head having two detector elements 12, 12' and two balancing elements 13, 13' which may be connected to form the four arms of a Wheatstone bridge.

FIG. 6 shows a head comprising detector and balancing elements 12 and 13 connected by three wires 21, 22 and 23 to the remainder of the detecting equipment which may be remote from the head.

The circuit shown has a resistor 24 connected to constitute the two further arms of the bridge, the adjustable tap on the resistor being connected to the base of a transistor 25. The total value of the resistor 24 may be 250 ohms. The junction of the elements 12 and 13 is connected to the emitter and a source of current at six volts is connected, as shown, across the resistor 24. The collector is connected through the winding of a relay 26, which may have an ohmic resistance of 100 ohms, to the negative terminal of the source. The relay contacts 27, when closed, serve to connect a warning or indicating lamp 28 across the current source. A lamp 29 may be provided to show that a continuous circuit through the head is provided when a switch 30 is closed to render the circuit operative. If there is a break in the elements 12 or 13 the only circuit for the lamp 29 is through the resistor 24 which is too high value to allow the lamp to light up.

The use of a transistor amplifier has many advantages over the use of a valve amplifier. One of these is the ability to use a supply of low voltage. An important advantage arises from the fact that a transistor is particularly well suited to operate with an input source of low impedance such as that constituted by the resistance of the balancing element 13.

With the circuit shown in FIG. 6, decrease in input voltage between the base and the emitter caused by the increase in voltage across the element 12 arising in the presence of inflammable gas will produce a rise in emitter current and in collector current. As the base current/base voltage input characteristic is approximately exponential in shape there is a considerable drop in the base current and hence a high degree of feed-back tending to counteract the original change. The circuit therefore stabilises against any change in collector current caused by rise in ambient temperature or a change in transistor characteristic.

It will, of course, be understood that the relay 26, when operated, can be arranged to actuate any form of indicating means such as a visual or aural alarm or switch off any device, such as the ignition system of an internal combustion engine, or an electric motor, that may be running and if allowed to continue running in the presence of inflammable gas may involve danger.

I claim:

1. In apparatus for detecting the presence of inflammable gases of the type including a Wheatstone bridge, at least two arms of said bridge including a detector element and a balancing element respectively, said elements being disposed close together, and hence exposed to similar ambient conditions, and having substantially the same temperature coefficient of resistance, said detector element including a helically wound wire having spaced turns and being constituted to be much more active catalytically than said balancing element, the improvement which comprises a detector element having the spaces between turns between about one-half and twice the diameter of the wire.

2. Apparatus according to claim 1, wherein the width of said spaces is substantially equal to the diameter of said wire.

3. Apparatus according to claim 1, wherein said balancing element also includes a helically wound wire having spaced turns, said wire of said detector element surrounding a catalytically active core and said wire of said balancing element surrounding a catalytically inactive core.

4. Apparatus according to claim 3, wherein said core of said detector element comprises a mixture including both platinum and palladium.

5. Apparatus according to claim 1 further comprising a current source connected across one diagonal of said bridge, a transistor, and responsive means, the emitter and base of said transistor being connected across the other diagonal of said bridge and the collector of said transistor being coupled to said responsive means.

6. Apparatus for detecting the presence of inflammable gases comprising a Wheatstone bridge, at least two arms of said bridge including a detector element and a balancing element respectively, said elements being disposed close together, and hence exposed to similar ambient conditions, and having substantially the same temperature coefficient of resistance, said detector element including a helically wound wire having spaced turns and being constituted to be much more active catalytically than said balancing element, a current source connected across one diagonal of said bridge, a transistor, and responsive means, the emitter and base of said transistor being connected across the other diagonal of said bridge and the collector of said transistor being coupled to said responsive means.

References Cited in the file of this patent
UNITED STATES PATENTS

| | | |
|---|---|---|
| 1,971,038 | Hamilton | Aug. 21, 1934 |
| 2,114,383 | Jacobson | Apr. 19, 1938 |
| 2,583,930 | Cotton | Jan. 29, 1952 |
| 2,768,069 | Thompson | Oct. 23, 1956 |
| 2,916,358 | Valentine et al. | Dec. 8, 1959 |